United States Patent [19]

Augsburger et al.

[11] 4,195,655

[45] Apr. 1, 1980

[54] VALVE FOR REGULATING THE FLOW OF HOT FLUIDS

[75] Inventors: Rolf Augsburger; Horst Kuppka; Helmut Zilling, all of Nüremburg, Fed. Rep. of Germany

[73] Assignee: Klein, Schanzlin, & Becker Aktiengesellschaft, Frankenthal, Fed. Rep. of Germany

[21] Appl. No.: 819,295

[22] Filed: Jul. 27, 1977

[30] Foreign Application Priority Data

Jul. 28, 1976 [DE] Fed. Rep. of Germany ....... 2633809

[51] Int. Cl.$^2$ ............... F16K 49/00; F16K 25/00; G21D 1/02
[52] U.S. Cl. ............... 137/340; 251/172; 137/334
[58] Field of Search ........... 137/340, 375, 334; 251/170, 172, 174

[56] References Cited

U.S. PATENT DOCUMENTS

| 267,234 | 11/1882 | Long | 137/340 |
|---|---|---|---|
| 2,029,777 | 2/1936 | Kinnaird | 137/334 |
| 3,062,238 | 11/1962 | Boyd | 92/43 |
| 3,136,330 | 6/1964 | Dowling | 137/340 |
| 3,319,423 | 5/1967 | Caraher | 137/334 |
| 3,487,849 | 1/1970 | Vietorisz | 137/340 |
| 3,580,539 | 5/1971 | Scoy | 251/172 |
| 3,916,940 | 11/1975 | Allen | 137/340 |

FOREIGN PATENT DOCUMENTS 910059 4/1954 Fed. Rep. of Germany ........... 137/340
2609027 9/1977 Fed. Rep. of Germany.

*Primary Examiner*—William R. Cline
*Assistant Examiner*—A. Michael Chambers
*Attorney, Agent, or Firm*—Peter K. Kontler

[57] ABSTRACT

A ball valve for controlling the flow of hot fluids in nuclear reactor plants has a tubular body for a spherical valving element which is flanked by two axially movable seats and is turnable between open and closed positions. Discrete bellows are provided to move the seats away from the valving element before the latter is set in motion and to urge the seats against the valving element when the latter assumes and dwells in the newly selected position. The body and the valving element define a main cooling chamber which accommodates the seats and receives pressurized coolant. Such coolant flows into the fluid-conveying passage of the body by way of a clearance between cylindrical heat-insulating layers at both sides of the valving element and the periphery of the valving element. Additional cooling chambers which are provided between the bellows and the insulating layers communicate with the clearance via gaps between the seats and the respective insulating layers. The valving element is cooled from within and admits coolant into channels machined into those surfaces of the seats which are movable into engagement with the valving element. The latter admits coolant into the channels via ports which create turbulence when the seats are retracted.

11 Claims, 10 Drawing Figures

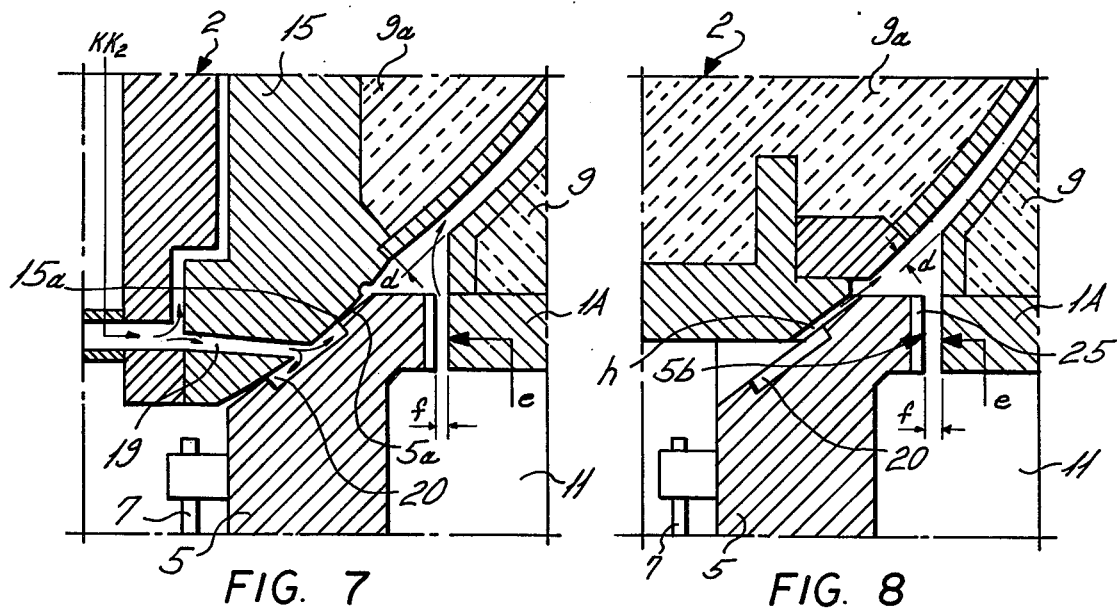
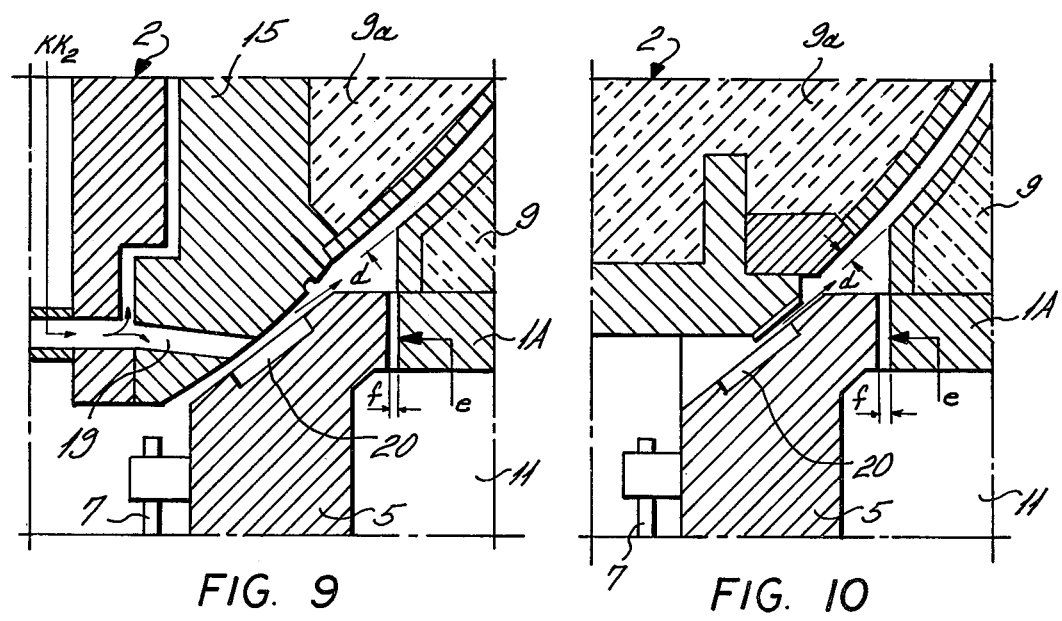

VALVE FOR REGULATING THE FLOW OF HOT FLUIDS

BACKGROUND OF THE INVENTION

The present invention relates to valves in general, and more particularly to improvements in valves which are designed for use at elevated temperatures, for example, in nuclear reactor plants. Still more particularly, the invention relates to improvements in high-temperature valves of the type wherein one or more seats are moved away from the valving element preparatory to movement of the valving element to a different position.

Valves of the above outlined character are employed at temperatures of up to 900° C. and at pressures of up to and even in excess of 40 bar. Under such circumstances, several component parts of the valve, especially the seat or seats, are subjected to extremely high thermally induced stresses. Mere cooling of the internal surface of the valve body and/or of the valving element does not suffice to prevent premature or immediate destruction of or pronounced damage to the seat or seats. On the other hand, and especially if the valve is to be used in a nuclear reactor plant or in an analogous institution where the safety of attendants is of utmost importance, it is necessary to undertake reliable measures in order to insure that the seat or seats, as well as other parts of the valve, will be capable of standing extended periods of use at extremely high temperatures and/or when the temperature fluctuates within a wide range.

OBJECTS AND SUMMARY OF THE INVENTION

An object of the invention is to provide a novel and improved valve which can function properly at low temperatures, at elevated temperatures as well as when the temperature of conveyed fluid fluctuates within an extremely wide range.

Another object of the invention is to provide novel and improved cooling system for a valve, especially for a ball valve, which can be used in nuclear reactor plants or similar institutions.

A further object of the invention is to provide a high-temperature valve whose useful life at elevated temperatures is a multiple of the useful life of presently known valves.

An additional object of the invention is to provide a novel and improved valving element for use in a valve of the above outlined character.

An ancillary object of the invention is to provide novel and improved means for thermally insulating the valving element and its seat or seats from the hot fluid which is conveyed through the valve body in open or partly open position of the valving element.

The invention is embodied in a valve, particularly for controlling the flow of hot fluids in nuclear reactor plants or similar institutions wherein the temperature of conveyed fluids often rises to and is maintained at several hundred degrees C. The valve comprises a valve body which defines a passage for the flow of hot fluid and includes heat-insulating means surrounding the passage, a spherical or otherwise configurated valving element which is installed in the body and is movable (turnable and/or reciprocable) between a plurality of positions including an open and a closed position (a spherical valving element is normally moved through 90 degrees), at least one annular seat installed in the body and being movable therein into and from complete sealing or nearly complete sealing engagement with the valving element, and bellows or other suitable means for moving the seat with respect to the body and valving element. The body and the valving element define a cooling chamber for the seat, and the body has one or more inlets for admission of pressurized fluid coolant into the chamber (the coolant may be the same fluid which flows through the body in open position of the valving element). The valving element and the insulating means of a body define a clearance for the flow of coolant from the chamber into the passage.

The bellows and the insulating means of the valve body preferably define a second cooling chamber which is in permanent communication with the passage of the body, preferably by way of the aforementioned clearance. Communication between the second chamber and the clearance can be established by way of a gap which is defined by a rear face of the seat and a face of the insulating means, at least when the seat engages the valving element. At least one of these faces has one or more flutes or analogous grooves which allow coolant to flow from the second chamber into the clearance when the seat is moved away from the valving element so that the two faces abut against each other.

That surface of the seat which abuts against a complementary surface of the valving element when the latter is idle is preferably provided with one or more channels which receive coolant by way of ports in the valving element. Such ports are preferably designed to create turbulence in the clearance when the seat is moved away from the valving element so that the coolant which issues from the ports flows into the clearance.

The valve body preferably further includes foraminous walls which separate portions of the first mentioned cooling chamber from the adjacent portions of the valving element. These walls define with the valving element relatively narrow gaps which receive coolant from the first mentioned chamber by way of openings in the walls.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is an enlarged view of a detail within the circle VII of FIG. 4;

FIG. 8 is an enlarged view of a detail within the circle VIII of FIG. 1;

FIG. 9 is an enlarged view of a detail within the circle IX of FIG. 3; and

FIG. 10 is an enlarged view of a detail within the circle X of FIG. 2.

DESCRIPTION OF THE PREFERRED EMBODIMENTS

Figure 1:
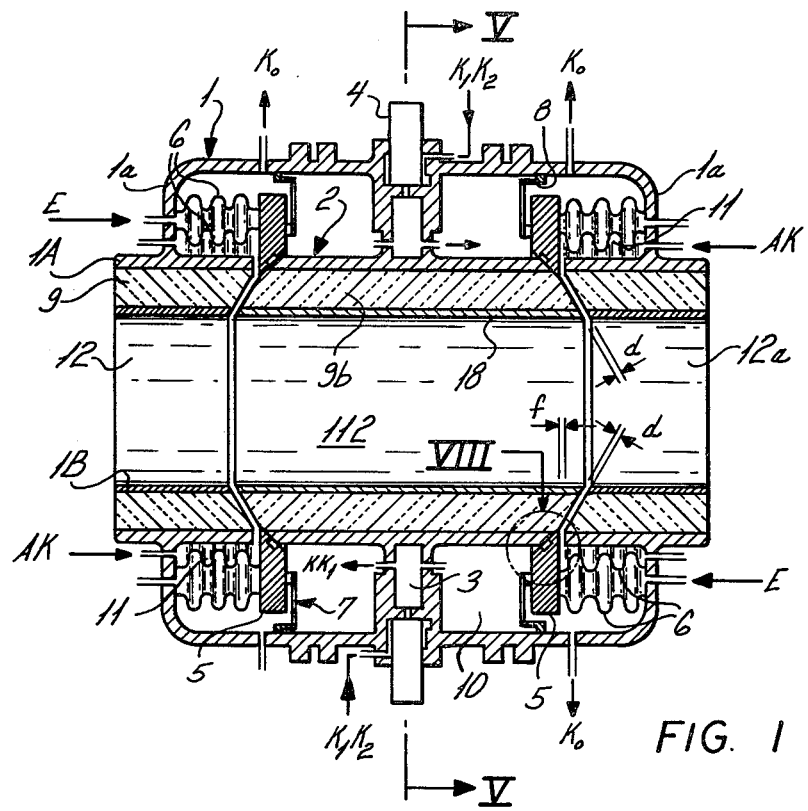
FIG. 1 is a central longitudinal sectional view of a ball valve which embodies the invention, the valving element being shown in open position and the two seats being shown in sealing engagement with the valving element.

Referring to FIGS. 1 to 4, there is shown a ball valve which comprises a cylindrical valve body or housing 1 for a spherical valving element 2 which is mounted in combined radial and thrust bearings 3 and is rotatable by an actuating member 4, e.g., a shank or shaft which extends outwardly through the body 1 and can be turned by hand or by a motor, not shown. The valving element 2 is rotatable through 90 degrees between the open position shown in FIGS. 1-2 and the closed position shown in FIGS. 3-4.

The valving element 2 is flanked by two annular sealing members or seats 5 which are movably mounted in the interior of the valve body 1, preferably in a manner as disclosed in detail in our commonly owned co-pending application Ser. No. 819296 filed July 27, 1977. As shown, the inner sides of the seats 5 (namely, those sides which face each other) are preferably adjustably connected to the inner portions of radially extending metallic rods 7 whose outer portions are bonded to metallic leaf springs 8 which are welded to the internal surface of the body 1. The rods 7 of each of the two sets of rods are preferably equally spaced from each other and the adjustable connections between their inner portions and the respective seats 5 allow for accurate centering of seats with respect to the valving element 2, e.g., to compensate for eventual machining tolerances. The means for moving the seats 5 axially comprises two metallic bellows 6, one for each seat. The bellows 6 are welded or otherwise sealingly secured to the outer sides of the respective seats 5 and to the corresponding end walls 1a of the body 1. When a bellows 6 receives pressurized fluid in the direction indicated by arrow E (FIG. 1), its axial length increases and the corresponding seat 5 is caused to sealingly engage the adjacent portion of the valving element 2. Inversely, when the pressurized fluid is permitted to escape from the bellows 6 (see the arrow E' in FIG. 2), the bellows contracts and moves the respective seat 5 away from the valving element 1. The exact nature of the source of pressurized fluid for the bellows 6 and of the means for regulating the admission of pressurized fluid into and the evacuation of fluid from the bellows forms no part of the present invention.

Figure 2:
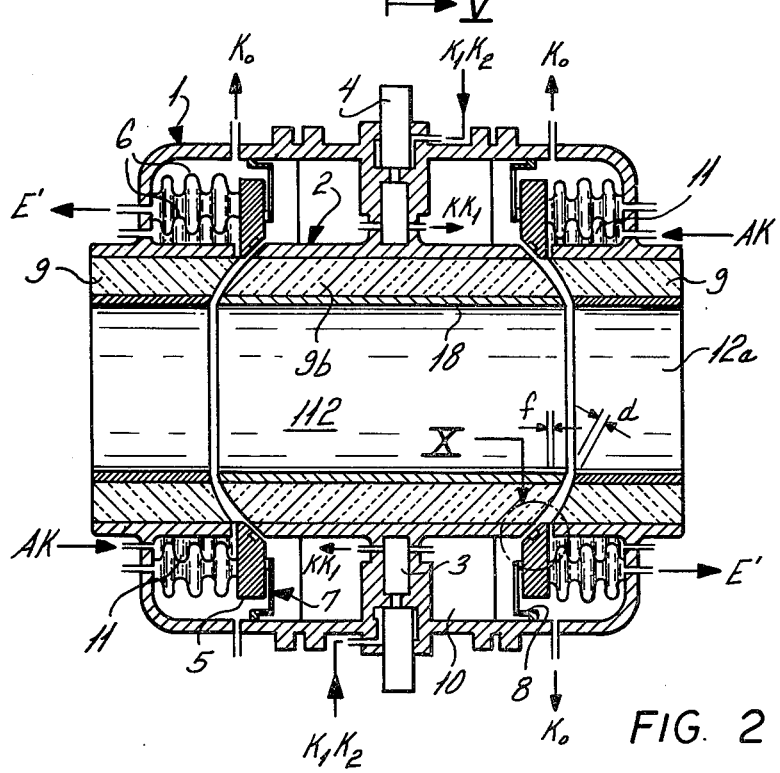
FIG. 2 illustrates the structure of FIG. 1 but with the seats in retracted positions.
Figure 3:
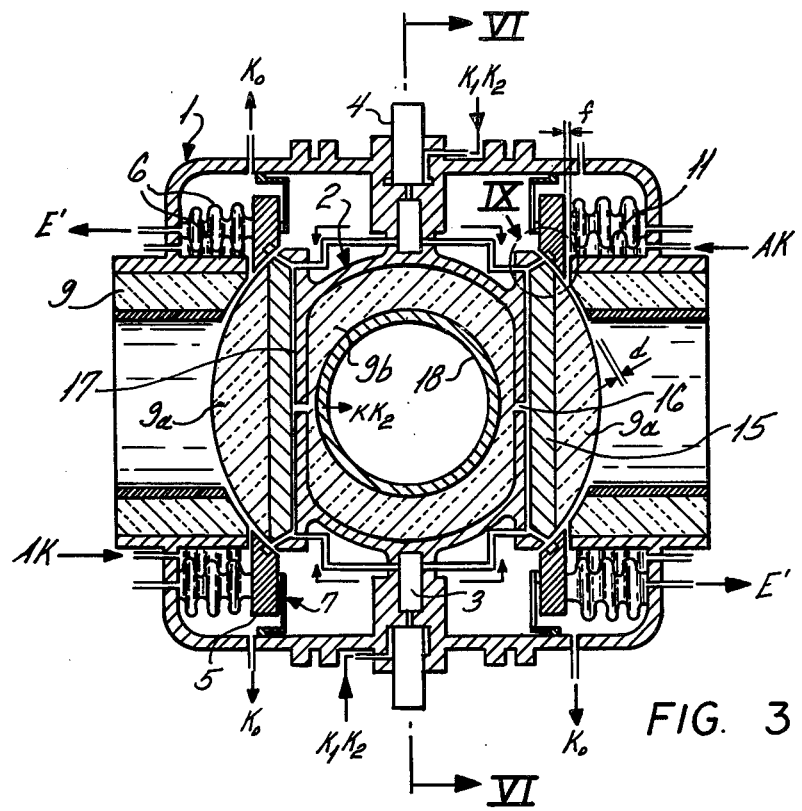
FIG. 3 illustrates the structure of FIG. 2, with the valving element in closed position.

The housing 1 defines a passage having coaxial sections 12 and 12a which communicate with each other by way of a diametrically extending passage 112 in the valving element 2 when the latter assumes the open position of FIG. 1 or 2. When the valving element 2 assumes the closed position of FIGS. 3-4, the passage 112 is out of register with the sections 12 and 12a. The valve body 1 has two pairs of concentric tubular metallic walls 1A and 1B which define two annular compartments filled with a cylinder of suitable heat-insulating material 9. The internal spaces of the left-hand and right-hand walls 1B respectively constitute the sections 12 and 12a of the passage in the valve body 1. The valving element 2 has two segment-shaped portions 9a of heat-insulating material which face the sections 12, 12a of the passage in the body 1 when the valving element assumes its closed position. The valving element 2 further comprises a cylindrical heat-insulating portion 9b which is disposed between an outer metallic shell 17 and an inner metallic shell 18; the latter surrounds the passage 112.

The housing 1 contains three cooling chambers including a main or primary cooling chamber 10 which surrounds the valving element 2 (and more particularly its shell 17) as well as the outer sides of the two bellows 6 and receives the seats 3. The other two cooling chambers 11 are surrounded by the bellows 6 and surround the corresponding outer tubular walls 1A of the valve body 1, i.e., the insulating cylinders 9. Each cooling chamber 11 extends between the outer side of the respective seat 5 and the corresponding end wall 1a of the body 1.

Figure 4:
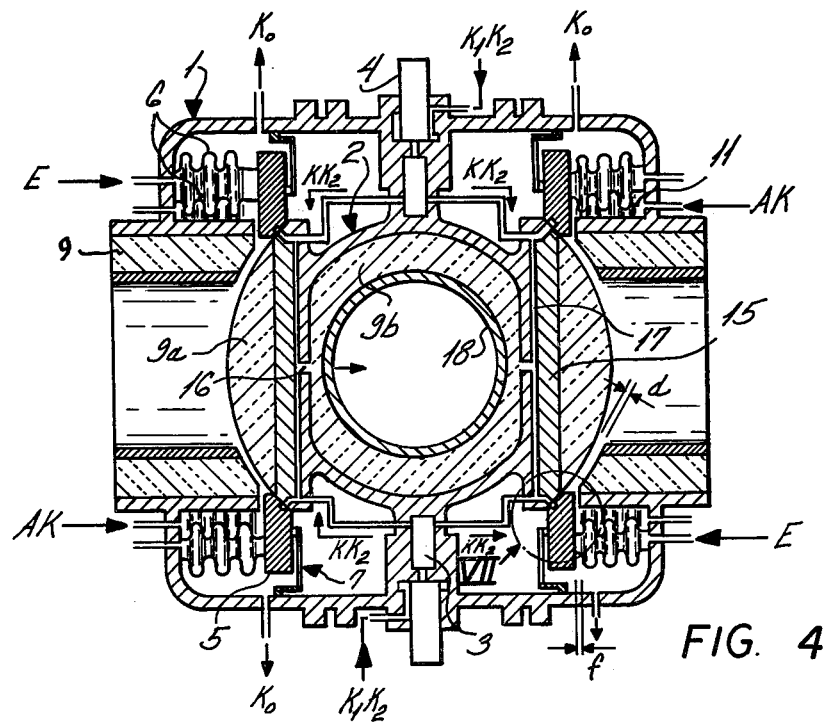
FIG. 4 illustrates the structure of FIG. 3 but with the seats in sealing engagement with the valving element.
Figure 5:
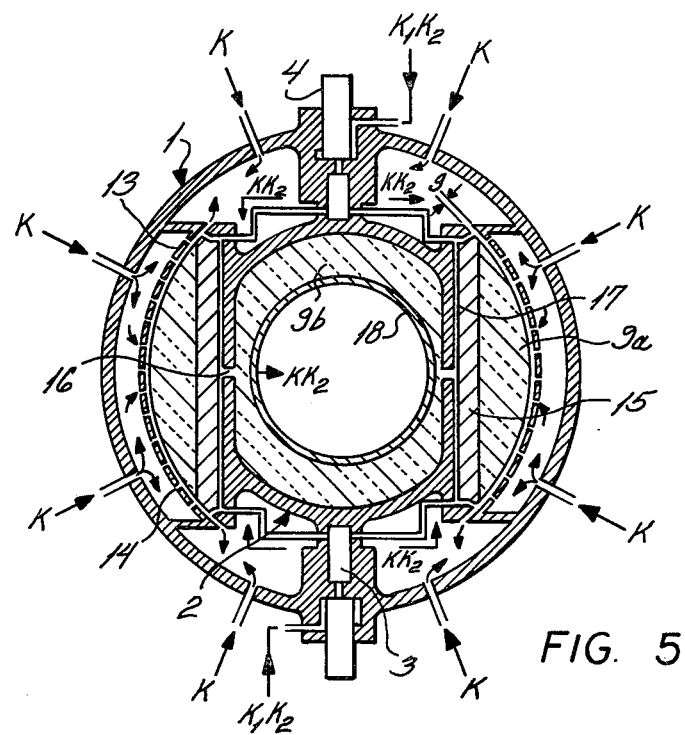
FIG. 5 is a transverse sectional view as seen in the direction of arrows from the line V—V of FIG. 1.
Figure 6:
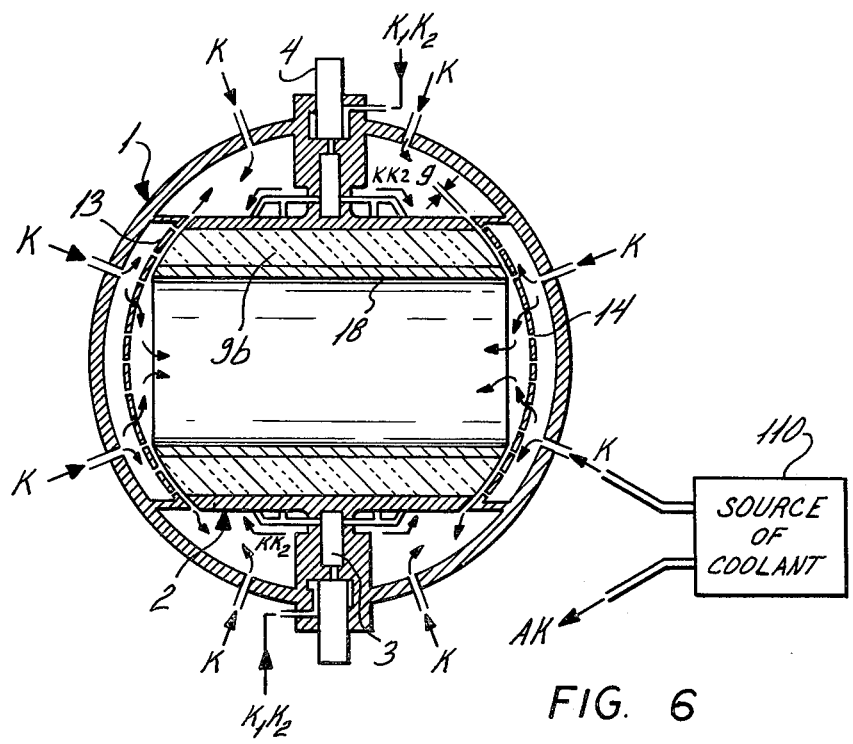
FIG. 6 is a transverse sectional view as seen in the direction of arrows from the line VI—VI of FIG. 3.

The main cooling chamber 10 receives coolant from a source 110 by way of inlets K which are shown in FIGS. 5-6 and are provided in the main portion of the valve body 1. Spent coolant leaves the chamber 10 via outlets Ko which are shown in FIGS. 1 to 4. The inlets for admission of coolant into the chambers 11 are shown at AK. Spent coolant leaves the chambers 11 by way of gaps f between the rear faces 5b of the seats 5 and the end faces or stops e of the respective tubular walls 1A of the body 1. Such coolant flows into the clearances d between the segments 9a and the adjacent portions 9, 1B of the valve body 1 and enters the respective sections 12, 12a of the passage in the valve body. The latter further comprises aracuate perforated walls 13 which spacedly surround the valving element 2 (see FIGS. 5 and 6) so that the parts 13 and 2 define gaps g. The perforated walls 13 extend along arcs of approximately 90 degrees and are disposed diametrically opposite each other. The spaces between the main portion of the body 1 and the walls 13 form part of the main cooling chamber 10; such spaces receive fresh coolant from the inlets K. The perforations or openings 14 of the walls 13 permit coolant to flow from the inlets into the respective gaps g.

The valving element 2 receives coolant by way of inlets or ports $K_1$ and $K_2$. The streams of coolant which enter the valving element 2 are divided into pairs of streams. One stream KK1 cools the respective bearing 3 and is admitted into the main cooling chamber 10. The other or second stream KK2 flows toward the respective seat 5 and enters the clearance d. A portion of the second stream KK2 also flows into a bore 16 of the shell 17, through the insulating layer 9b and enters the passage 112 via openings in the shell 18. The latter may be assembled of several arcuate portions consisting of sheet metal and defining the just mentioned openings. Each second stream KK2 further flows into the corresponding bores or ports 19 of the valving element 2 (see FIGS. 7 and 9) and into a channel 20 in the concavely curved annular sealing surface 5a of the associated seat 5. The ports 19 form an annulus of equally distributed ports along the entire circumference of the corresponding sealing member 15 of the valving element 2. Each sealing member 15 has a convexly curved peripheral surface 15a which can be engaged by the surface 5a of the respective seat 5. Coolant is caused to circulate in the channels 20 when the seats 5 are moved to the positions shown in FIGS. 1 and 4; i.e., into contact with the valving element 2.

When the valving element 2 assumes the open position of FIG. 1 and the seats 5 are caused to bear against the respective sealing members 15 (see also FIG. 8), a stream of coolant flows from the main cooling chamber 10, through grooves or flutes h of the surface 15a of the valving element 2, through the clearance d and into the respective section 12 or 12a of the passage in the valve body 1. Two streams of coolant flow from the chambers 11, through the gaps f between the faces 5b of the seats 5 and the stops or faces e of the respective walls 1A, and into the respective sections 12, 12a via clearance d.

The seats 5 are retracted before the valving element 2 is moved from the open position. This is shown in FIGS. 2 and 10. The seats 5 remain retracted during movement of the valving element 2 to a different position, e.g., to the closed position of FIG. 3 or 4, i.e., the seats then abut against the faces e of the corresponding walls 1A. Streams of coolant flow from the chamber 10 and through the gaps between the surfaces 5a and 15a. Additional streams flow from the chambers 11 through the flutes 25 in the rear faces 5b of the seats 5. Such streams merge in the clearance d and flow into the sections 12, 12a of the passage in the valve body 1. The flutes 25 can be omitted if the gaps f are not fully closed in retracted positions of the seats 5. Furthermore, the flutes 25 can be provided in the rear faces 5b of the seats 5 and /or in the faces e of the walls 1A.

When the valving element 2 is moved to the closed position and the seats 5 are still retracted (see FIGS. 3 and 9), the streams which are admitted into the ports 19 of the sealing members 15 are free to flow into the clearance d and into the passage of the valve body 1.

The seats 5 are thereupon moved into engagement with the sealing members 15 of the valving element 2 (see FIGS. 4 and 7). Coolant flows from the ports 19 of sealing members 15 into the channels 20 of the surfaces 5a and circulates in the channels 20 to cool the seats 5 while the valving element 2 remains in closed position. The clearance d then receives only such coolant which flows from the chambers 11 via gaps f. The walls 13 shield the coolant in the corresponding portions of the main cooling chamber 10 from hot fluid in the sections 12 and 12a of the passage in the valve body 1. In addition, the openings 14 of the walls 13 admit streamlets of coolant toward the outer sides of the adjacent portions of the heat-insulating layers 9a. In other words, the valving element 2 is surrounded by a flowing body of coolant while it assumes the closed position.

An important advantage of the improved valve is that the seats 5 are effectively shielded from hot fluid in the passage of the valve body 1. The major part of each seat is contacted by coolant in the main chamber 10. Furthermore, the seats 5 are contacted by coolant in the chambers 11, and their surfaces 5a are effectively cooled by fluid which is admitted via ports 19 and circulates in the channels 20. The cooling chambers 10 and 11 are shielded from hot fluid by the heat-insulating layers 9 and 9b.

The clearance d between the valving element 2 and the valve body 1 permits the flow of coolant into the passage 12, 12a in each position of the valving element and in each position of the seats 5. The coolant in the source 110 may be the same fluid which is conveyed through the passages 12, 12a and 112, except that its temperature is lower and its pressure higher than that of fluid in 12, 12a and 112. This prevents the hot fluid from penetrating into the cooling chambers and from raising the temperature of the seats 5. Furthermore, the regions where the seats 5 are movable into sealing engagement with the valving element 2 are cooled by a circulating fluid in each and every position of the valving element and/or seats.

The walls 13 protect the valving element 2 against overheating when the valving element dwells in the open or closed position and such walls insure that hot fluid in the section 12 and/or 12a cannot flow into the cooling chambers while the valving element is in motion.

The coolant which is admitted into the chambers 11 independently of admission of coolant into the chamber 10 cools the inner membranes of the bellows 6, the rear faces 5b of the seats 5 and the walls 1A. Furthermore, such coolant also serves to prevent the penetration of hot fluid into the chamber 10 because it flows via gaps f and into the clearance d to enter the sections 12 and 12a. The pressure of coolant which is admitted via inlets AK exceeds the pressure in the sections 12 and 12a. The flutes 25 insure that the chambers 11 can communicate with the clearance d in sealing as well as in retracted positions of the seats 5.

The aforediscussed features insure that the temperature of each seat 5 is well below the temperature of fluid in the section 12 and/or 12a, regardless of whether the valving element 2 is idle or moves between its open and closed positions. These features (including shielding of chambers 10, 11, 11 and the major part of valving element 2 from hot fluid in the section 12 and/or 12a, admission of discrete streams of coolant into the chambers 10 and 11, prevention of flow of hot fluid into the cooling chambers, cooling of the bearings 3 and of the valving element, and direct cooling of all sides of seats 5) further insure that the improved valve can be used as a simpler, longer-lasting and more reliable substitute for presently known high-temperature valves.

The ports 19 and/or other fluid conveying cavities, bores or the like are preferably designed to effect at least some turbulence in the flow of coolant, especially when the seats 5 are retracted from the sealing members 15 of the valving element 2. This further enhances the cooling action upon the parts 2 and 5. As mentioned above, the valving element 2 is cooled from inside by the streams KK2. It has been found that the aforedescribed cooling and insulating features invariably prevent overheating of the valving element and seats, even for short intervals of time, not only when the valving element is idle but also when such element is in motion and even if the temperature of fluid in the section 12 and/or 12a is extremely high.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and therefore, such adaptations should and are intended to be comprehended within the meaning and range of equivalence of the claims.

What is claimed is:

1. A valve, particularly for controlling the flow of hot fluids in nuclear reactor plants or the like, comprising a valve body defining a passage for the flow of hot fluid and including heat-insulating means surrounding said passage; a valving element installed in said body and movable between a plurality of positions including an open and a closed position; at least one annular seat installed in said body and movable therein into and from sealing engagement with said element; and means for moving said seat with respect to said body, said body and said element defining a cooling chamber for said seat and said body having inlet means for admission of fluid coolant into said chamber, said element and said insulating means defining a clearance for the flow of coolant from said chamber into said passage.

2. A valve as defined in claim 1, wherein said moving means comprises a bellows spacedly surrounding said insulating means and defining therewith an annular second cooling chamber in permanent communication with said clearance.

3. A valve as defined in claim 2, wherein said element has a first surface and said seat has a second surface abutting against said first surface when said seat is moved against said element, said seat and said body defining a gap which establishes communication between said second chamber and said passage at least while said second surface abuts against said first surface.

4. A valve as defined in claim 3, wherein said body has a first face bounding one side of said gap and said seat has a second face bounding another side of said gap, said faces abutting against each other on movement of said seat away from said element and at least one of said faces having at least one groove which establishes communication between said second chamber and said passage via said clearance when said seat is remote from said element.

5. A valve as defined in claim 4, wherein said first face constitutes a stop which limits the extent of movement of said seat in a direction away from said element.

6. A valve as defined in claim 3, wherein at least one of said surfaces has at least one coolant-circulating channel and the other of said surfaces has port means for admission of coolant into said channel.

7. A valve as defined in claim 2, further comprising a source of pressurized coolant, said source being in communication with said first mentioned chamber by way of said inlet means and said body having second inlet means connecting said source with said second chamber, the pressure of said coolant exceeding the pressure in said passage so that the coolant which flows into said passage via said clearance prevents the penetration of fluid from said passage into said chambers.

8. A valve as defined in claim 1, wherein said body further comprises foraminous wall means interposed between portions of said chamber and said element.

9. A valve as defined in claim 8, wherein said element is a sphere and said wall means and said element define a gap which receives coolant via openings provided in said wall means.

10. A valve as defined in claim 1, wherein said element includes a sealing member having a first surface and said seat has a second surface which bears against said first surface when said seat is moved toward said element, said element having at least one bore to permit for circulation of coolant which cools said sealing member.

11. A valve as defined in claim 1, wherein said element has turbulence-creating ports which permit the escape of coolant into said clearance on movement of said seat away from said element.

* * * * *